US012131707B2

(12) United States Patent
Yu et al.

(10) Patent No.: US 12,131,707 B2
(45) **Date of Patent: *Oct. 29, 2024**

(54) DISPLAY DEVICE, DATA DRIVER AND TIMING CONTROLLER

(71) Applicant: LG Display Co., Ltd., Seoul (KR)

(72) Inventors: Ri Yu, Seoul (KR); Myoungjae Kang, Changwon-si (KR); Bonghwan Kim, Ulsan (KR); Unseon Lee, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/535,506

(22) Filed: Dec. 11, 2023

(65) Prior Publication Data

US 2024/0112641 A1 Apr. 4, 2024

Related U.S. Application Data

(63) Continuation of application No. 17/994,616, filed on Nov. 28, 2022, now Pat. No. 11,881,179.

(30) Foreign Application Priority Data

Dec. 9, 2021 (KR) ........................ 10-2021-0175813

(51) Int. Cl.
*G09G 3/3275* (2016.01)
*G09G 3/3266* (2016.01)

(52) U.S. Cl.
CPC ......... *G09G 3/3275* (2013.01); *G09G 3/3266* (2013.01); *G09G 2310/0289* (2013.01); *G09G 2310/08* (2013.01); *G09G 2320/041* (2013.01); *G09G 2330/021* (2013.01); *G09G 2330/04* (2013.01)

(58) Field of Classification Search
None
See application file for complete search history.

(56) References Cited

U.S. PATENT DOCUMENTS

| | | | | |
|---|---|---|---|---|
| 10,679,571 B2 * | 6/2020 | Chiu | ...................... | G09G 3/344 |
| 2022/0180815 A1 * | 6/2022 | Kim | ..................... | G09G 3/3233 |
| 2022/0317538 A1 * | 10/2022 | Zhang | .................... | G09G 3/344 |

* cited by examiner

*Primary Examiner* — Christopher J Kohlman
(74) *Attorney, Agent, or Firm* — Fenwick & West LLP

(57) ABSTRACT

A display apparatus may include a first drive circuit configured to output a driving signal, the driving signal including a first period during which the driving signal has a first value, a second period during which the driving signal has a second value different from the first value, and a third period during which the driving signal has a third value between the first value and the second value; a second drive circuit configured to receive the driving signal and generate a gate signal based on the driving signal; and a display panel including a light emitting device that is configured to emit light based on the gate signal, wherein a length of at least one of the first period, the second period, or the third period is adjustable based on a temperature associated with the display apparatus.

20 Claims, 12 Drawing Sheets

DISPLAY DEVICE, DATA DRIVER AND TIMING CONTROLLER

CROSS REFERENCE TO RELATED APPLICATION

This application is a continuation of U.S. patent application Ser. No. 17/994,616 filed on Nov. 28, 2022, which claims priority from Republic of Korea Patent Application No. 10-2021-0175813, filed on Dec. 9, 2021, each of which is hereby incorporated by reference in its entirety.

TECHNICAL FIELD

The present disclosure relates to a display device, a data driver, and a timing controller for preventing or at least reducing a driving error due to temperature change.

BACKGROUND

With the development of technology, there are being developed various display devices (or display apparatus) having excellent performance such as reduction in thickness, weight reduction, and low power consumption. A specific example of such a display device may be an organic light emitting diode (OLED) device.

The organic light emitting display device is a self-luminous display device which emits light by excitation of an organic compound. Since the organic light emitting diode display does not require a backlight used in a liquid crystal display (LCD) device, there is an advantage in that not only light weight and thinness are possible, but also the manufacturing process can be simplified. In addition, since the organic light emitting display device has the advantages of being able to be manufactured at a low temperature, having a high-speed response with a response speed of 1 ms or less, and having characteristics such as low power consumption, the organic light emitting display device has recently been widely used.

The organic light emitting diode display device utilizes various signals for driving thereof. A signal used for driving the organic light emitting diode display device may be changed according to a change in temperature of the organic light emitting diode display device. For example, in the case of rising the temperature rises, there may occur a sagging or a stretch of the signal waveform due to an increase in resistance capacitance (RC) delay. In this case, there may be caused driving abnormalities such as an abnormal black expression phenomenon (black spots), an increase in a spot level, or a change in color of a display area in the organic light emitting diode display device. Accordingly, there is a need for a method for preventing abnormal driving of the organic light emitting display device due to a change in temperature.

SUMMARY

An object of embodiments of the present disclosure is to provide a display device capable of stably driving despite a change in temperature by controlling a signal to include a period having a specific value corresponding to the temperature, and a data driver and timing controller included therein.

However, the objects of the present disclosure are not limited to those mentioned above, and may be inferred other technical objects from the following embodiments.

In one embodiment, a display apparatus comprises: a first drive circuit configured to output a driving signal, the driving signal including a first period during which the driving signal has a first value, a second period during which the driving signal has a second value different from the first value, and a third period during which the driving signal has a third value between the first value and the second value; a second drive circuit configured to receive the driving signal and generate a gate signal based on the driving signal; and a display panel including a light emitting device that is configured to emit light based on the gate signal, wherein a length of at least one of the first period, the second period, or the third period is adjustable based on a temperature associated with the display apparatus.

In one embodiment, a circuit included in a display apparatus comprises: a signal generator circuit configured to generate, a driving signal based on a temperature associated with the display apparatus, the driving signal comprising a first period during which the driving signal has a first value, a second period during which the driving signal has a second value different from the first value, and a third period during which the driving signal has a third value between the first value and the second value; and an outputter circuit configured to output the generated driving signal, wherein a length of at least one of the first period, the second period, or the third period of the driving signal is adjustable based on the temperature associated with the display device.

In one embodiment, a display apparatus comprises: a first drive circuit configured to generate a driving signal having a first period during which the driving signal has a first value and a second period during which the driving signal has a second value different from the first value, the first drive circuit adjusting a length of time to transition between the first value and the second value based on a temperature associated with the display apparatus; a second drive circuit configured to receive the driving signal and generate a gate signal based on the driving signal; and a display panel including a light emitting device that is configured to emit light based on the gate signal.

The specific details of other embodiments are included in the detailed description and drawings.

According to a display device, a data driver and a timing controller of the present disclosure, the image quality of the display device may be improved by controlling the signal to include a period having a specific value corresponding to the temperature.

However, the effects obtainable in the present disclosure are not limited to the above-mentioned effects, and other effects not mentioned may be understood clearly to those of ordinary skill in the art to which this disclosure belongs from the description below.

DETAILED DESCRIPTION

Figure 1:
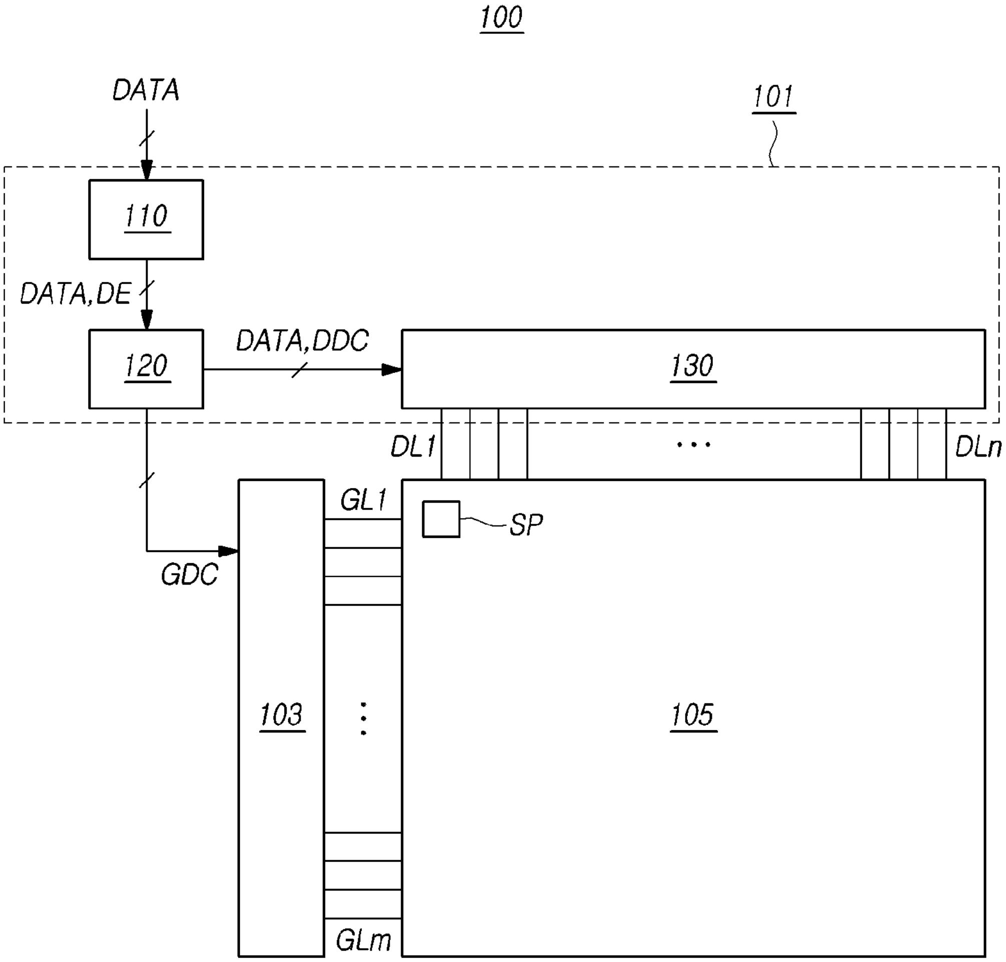
FIG. 1 is a block diagram of a display device according to an embodiment of the present disclosure.

The terms used in the embodiments are selected as currently widely used general terms as possible while considering the functions in the present disclosure, which may vary depending on the intention of a person skilled in the art, the precedent, or the emergence of new technology, etc. In addition, in a specific case, there is a term arbitrarily selected by the applicant, and in this case, the meaning thereof will be described in detail in the corresponding description. Therefore, the terms used in the present disclosure should be defined based on the meaning of the term and the overall contents of the present disclosure, rather than the simple name of the term.

In the entire specification, when a part “includes” a specific element, it means that other elements may be further included, rather than excluding other elements, unless otherwise stated.

The expression of “at least one of a, b, and c” described throughout the specification may include a configuration of ‘a alone’, ‘b alone’, ‘c alone’, ‘a and b’, ‘a and c’, ‘b and c’, or ‘all a, b, and c’. Advantages and features of the present disclosure, and a method for achieving them will become apparent with reference to the embodiments described below in detail in conjunction with the accompanying drawings.

The shape, area, ratio, angle, number, etc. disclosed in the drawings for explaining the embodiment in the present specification are exemplary and the embodiment of the present specification is not limited to the illustrated matters. In addition, in describing the embodiment, if it is determined that a detailed description of a related known technology may unnecessarily obscure the gist of the embodiment, the detailed description thereof will be omitted.

In the case that the terms of ‘include’, ‘have’, ‘comprise’ etc. are used in this specification, it should be understood as being able to add other parts or elements. When an element is expressed in the singular, there may be understood to include cases including the plural unless otherwise explicitly stated. In addition, in interpreting the elements, it should be interpreted as including an error range even if there is no separate explicit description.

In the description related to spatial relationship, for example, when the positional relationship of two element is described using the terms of “on”, “upper”, “above”, “below”, “under”, “beneath”, “lower”, “near”, “close”, “adjacent”, it should be interpreted that one or more elements may be further “interposed” between the elements unless the terms such as “directly”, “only” are used. The configuration in which an element or layer is disposed “on” another element or layer includes both the case where the element or layer is disposed directly on the other element or the case where another layer or other element is interposed therebetween.

When the terms, such as “first”, “second”, or the like, are used herein to describe various elements or components, it should be considered that these elements or components are not limited thereto. These terms are merely used herein for distinguishing an element from other elements. Therefore, a first element mentioned below may be a second element in a technical concept of the present disclosure.

The area, length, or thickness of each component described in the specification is illustrated for convenience of description, and the present invention is not necessarily limited to the area and thickness of the illustrated component.

The features of each of the embodiments of the present specification may be partially or wholly combined or coupled with each other, and may be various technically linked or operated. In addition, each of the embodiments may be implemented independently of each other or may be implemented together in a related relationship.

In addition, the terms to be described later are terms defined in consideration of functions in the implementation of the present specification, which may vary depending on the intention or custom of the user or operator. Therefore, the definition should be made based on the content throughout this specification.

A transistor constituting a pixel circuit of the present specification may include at least one of an oxide thin film transistor (oxide TFT), an amorphous silicon TFT (a-Si TFT), and a low temperature poly silicon TFT (LTPS TFT).

The following embodiments will be mainly described with respect to an organic light emitting diode display device. However, embodiments of the present disclosure are not limited to an organic light emitting display device, and may be applied to an inorganic light emitting display device including an inorganic light emitting material. For example, embodiments of the present disclosure may be applied to a quantum dot display device.

Expressions such as ‘first’, ‘second’, and ‘third’ are terms used to classify configurations according to embodiments, and embodiments are not limited to these terms. Therefore, it should be noted that even the same terms may refer to different components according to embodiments.

Hereinafter, embodiments of the present disclosure will be described with reference to the drawings.

FIG. 1 is a block diagram of a display device according to an embodiment of the present disclosure.

A display device 100 according to an embodiment of the present disclosure may be an electroluminescent display device. The electroluminescent display device may include an organic light emitting diode (OLED) display device, a quantum-dot light emitting diode (QLED) display device, or an inorganic light emitting diode display device.

Referring to FIG. 1, the display device 100 may include a data driver 101, a gate driver 103 and a display panel 105.

In an embodiment, the data driver 101 may include an image processing unit 110, a timing controller 120 and a data output unit 130. According to an embodiment, the data driver 101 may be formed in the form of an integrated circuit (IC).

The image processing unit 110 outputs a data enable signal DE along with the data signal DATA supplied from the outside. The image processing unit 110 may output one or more of a vertical synchronization signal, a horizontal synchronization signal, and a clock signal in addition to the data enable signal DE. However, illustration of these signals is omitted for convenience of description.

The timing controller 120 may receive a driving signal including the data enable signal DE or a vertical synchronization signal, a horizontal synchronization signal, and a clock signal along with the data signal DATA from the image processing unit 110. The timing controller 120 outputs a gate timing control signal GDC for controlling the operation timing of the gate driver 103 and a data timing control signal DDC for controlling the operation timing of the data output unit 130 based on the driving signal.

The timing controller 120 may include a semiconductor for a display device so as to improve image quality by adjusting the amount of data transferred (or transmitted) to the data output unit 130. The timing controller 120 may be referred to as a timing control unit T-CON according to an embodiment, but is not limited thereto.

The data output unit 130 samples and latches the data signal DATA provided from the timing controller 120 in response to the data timing control signal DDC provided from the timing controller 120 to convert into a gamma reference voltage to output the converted signal. The data output unit 130 outputs the data signal DATA through the data lines DL1 to DLm.

FIG. 1 illustrates an example in which the image processing unit 110, the timing controller 120 and the data output unit 130 are implemented as one element, but the present disclosure is not limited thereto. Alternatively, the image processing unit 110, the timing controller 120 and the data output unit 130 may each be implemented as a separate configuration. In this case, the operation performed by a first drive circuit described later may be performed by the timing controller 120. That is, the first drive circuit to be described later may correspond to the timing controller 120 according to an embodiment.

The gate driver 103 outputs (or provides) a gate signal (or a scan signal) in response to the gate timing control signal GDC supplied from the timing controller 120. The gate driver 103 outputs the gate signal through the gate lines GL1 to GLn+1.

FIG. 1 illustrates an example in which the gate driver 103 is disposed at one side of the display panel 105, but the present disclosure is not limited thereto. For example, a plurality of gate drivers 103 may be respectively disposed at both side of the display panel 105. In this case, the gate drivers 103 disposed at both sides may simultaneously output gate signals from both sides to one gate line, so that the signal may be output more quickly.

In an embodiment, the gate driver 103 may be formed in the form of an integrated circuit (IC) or may be formed in the display panel 105 in the form of a gate-in-panel (GIP).

The display panel 105 displays an image corresponding to the data signal DATA and the scan signal supplied from the data driver 101 and the gate driver 103. The display panel 105 includes sub-pixels SP which operate to display an image. The display panel 105 may include a plurality of sub-pixels SP. One pixel may be composed of at least a portion of a plurality of sub-pixels. For example, one pixel may be composed of a red sub-pixel, a green sub-pixel, and a blue sub-pixel. For another example, one pixel may include a white sub-pixel, a red sub-pixel, a green sub-pixel, and a blue sub-pixel. Each sub-pixel SP may have one or more different emission areas according to emission characteristics.

Figure 2:
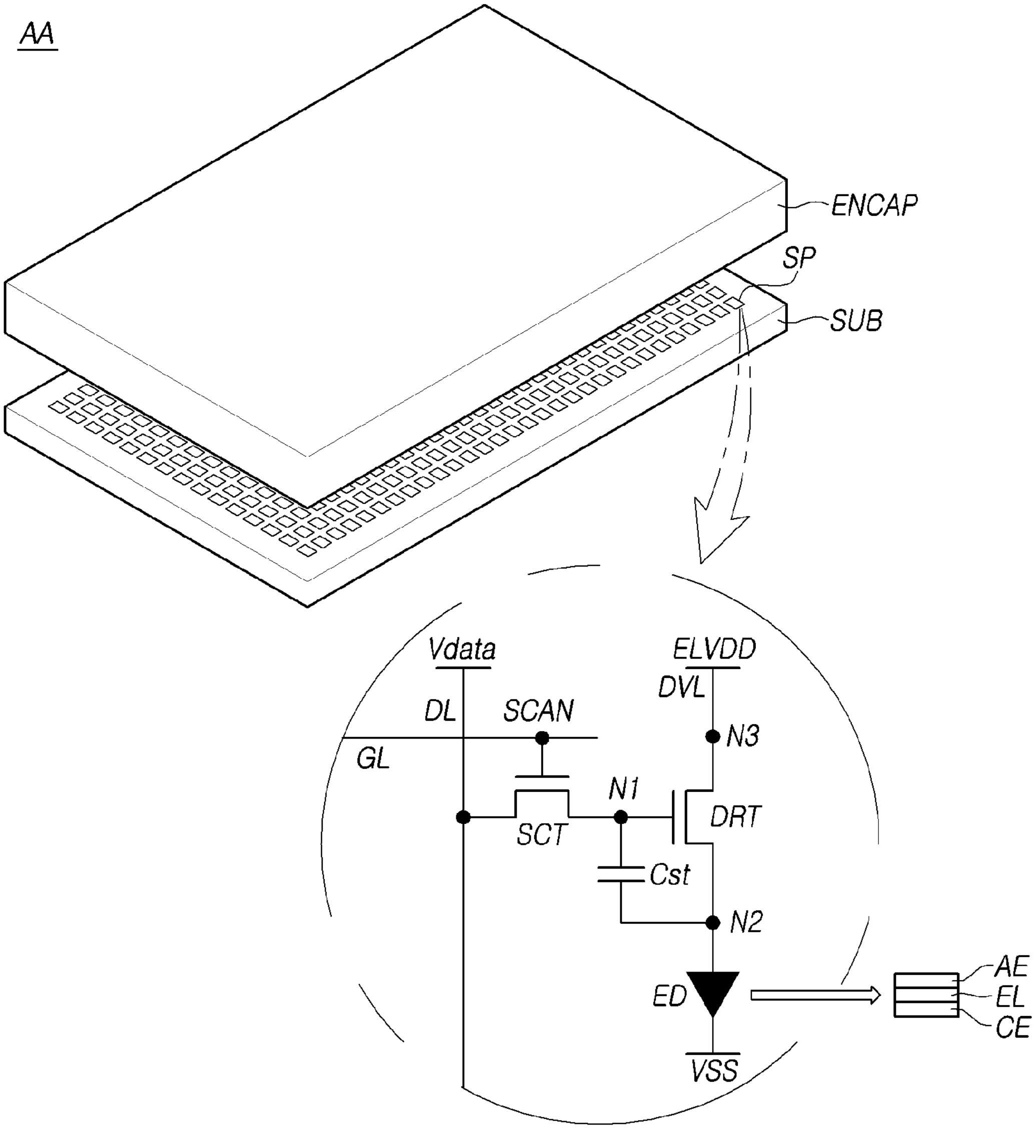
FIG. 2 illustrates an example of an equivalent circuit diagram of a sub-pixel of a display device according to an embodiment of the present disclosure.

FIG. 2 illustrates an example of an equivalent circuit diagram of a sub-pixel of a display device according to an embodiment of the present disclosure.

Referring to FIG. 2, each of the sub-pixels SP disposed in a display area AA of a display panel (e.g., the display panel 105 of FIG. 1) may include a light emitting device ED, a driving transistor DRT for driving the light emitting device ED, a scan transistor SCT for transferring a data voltage Vdata to a first node N1 of the driving transistor DRT, and a storage capacitor Cst for maintaining a constant voltage during one frame.

The driving transistor DRT may include the first node N1 to which the data voltage Vdata is applied, a second node N2 electrically connected to the light emitting device ED, and a third node N3 to which the high potential common voltage ELVDD is applied from a driving voltage line DVL. In the driving transistor DRT, the first node N1 may be a gate node, the second node N2 may be a source node or a drain node, and the third node N3 may be a drain node or a source node.

The light emitting device ED may include an anode electrode AE, a light emission layer EL, and a cathode electrode CE. The anode electrode AE may be a pixel electrode disposed in each subpixel SP, and may be electrically connected to the second node N2 of the driving transistor DRT of each sub-pixel SP. The cathode electrode CE may be a common electrode commonly disposed in the plurality of sub-pixels SP, and a low potential common voltage VSS may be applied thereto.

For example, the anode electrode AE may be a pixel electrode, and the cathode electrode CE may be a common electrode. Conversely, the anode electrode AE may be a common electrode, and the cathode electrode CE may be a pixel electrode. Hereinafter, for convenience of description, it is assumed that the anode electrode AE is a pixel electrode and the cathode electrode CE is a common electrode.

For example, the light emitting device ED may be an organic light emitting diode (OLED), an inorganic light emitting diode, or a quantum dot light emitting device. In the case that the light emitting device ED is an organic light emitting diode, the light emission layer EL in the light emitting device ED may include an organic light emitting layer including an organic material.

The scan transistor SCT may be controlled to be turned on/off by the scan signal SCAN, which is a gate signal applied through the gate line GL. The scan transistor SCT may be configured to switch an electrical connection between the first node N1 of the driving transistor DRT and the data line DL.

The storage capacitor Cst may be electrically connected between the first node N1 and the second node N2 of the driving transistor DRT.

Each sub-pixel SP may have a 2T-1C structure including two transistors DRT and SCT and one capacitor Cst as shown in FIG. 2. However, the present embodiment is not limited thereto, and in some cases, one or more transistors may be further included or one or more capacitors may be further included.

The storage capacitor Cst may be not a parasitic capacitor (e.g., Cgs, Cgd) as an internal capacitor that may exist between the first node N1 and the second node N2 of the driving transistor DRT, but may be an external capacitor intentionally designed outside the driving transistor DRT.

Each of the driving transistor DRT and the scan transistor SCT may be an n-type transistor or a p-type transistor.

Since the circuit elements (in particular, the light emitting element ED) in each sub-pixel SP are vulnerable to external moisture or oxygen, there may be disposed an encapsulation layer ENCAP for preventing or at least reducing external moisture or oxygen from penetrating into the circuit elements (particularly, the light emitting element ED) on the display panel 110. The encapsulation layer ENCAP may be disposed to cover the light emitting devices ED.

Figure 3:
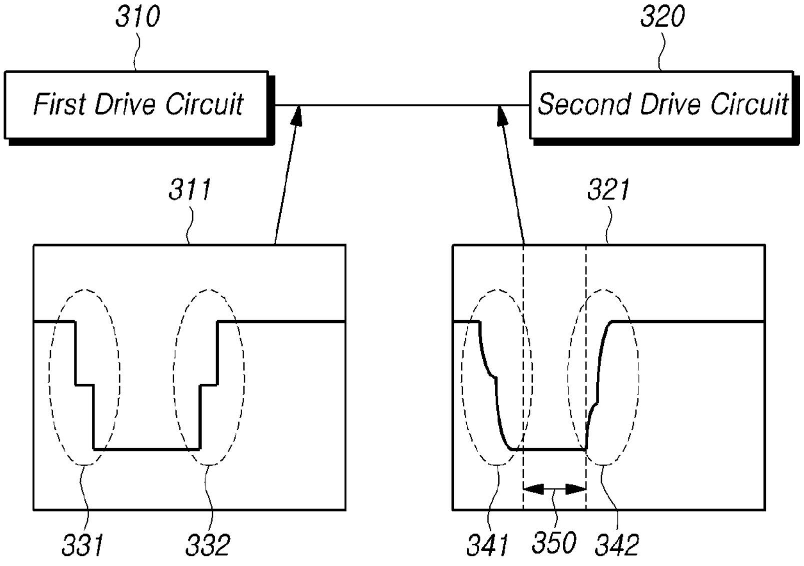
FIG. 3 is a diagram for explaining a change caused in a signal of a display device according to an embodiment of the present disclosure.

FIG. 3 is a diagram for explaining a change caused in a signal of a display device according to an embodiment of the present disclosure.

Referring to FIG. 3, a first drive circuit 310 may be connected to a second drive circuit 320. The first drive circuit 310 may provide a driving signal (e.g., a clock signal) to the second drive circuit 320 based on the connection to the second drive circuit 320. In some embodiments, the first drive circuit 310 may be connected to the second drive circuit 320 with another configuration therebetween. In this case, the first drive circuit 310 may provide a driving signal to the second drive circuit 320 through the other configuration.

In an embodiment, the first drive circuit 310 may include a data driver (e.g., the data driver 101 of FIG. 1). However, the present disclosure is not limited thereto, and in some cases, the first drive circuit 310 may include a timing controller (e.g., the timing controller 120 of FIG. 1) or the first drive circuit 310 may be included in a level shifter. In this case, the driving signal provided by the first drive circuit 310 may be provided by the timing controller.

In an embodiment, the second drive circuit 320 may receive the driving signal from the first drive circuit 310. The second drive circuit 320 may generate a gate signal (e.g., a scan signal or a light emission signal) for emitting light of the light emitting device based on the received driving signal. The scan signal is used to turn on the scan transistor SCT thereby turning on the subpixel that includes the scan transistor SCT, for example. The light emission signal is used to turn on a light emission transistor disposed between the driving transistor DRT and the light emitting device ED (not shown) in the subpixel, for example.

In an embodiment, the driving signal provided from the first drive circuit 310 may include a first period during which the driving signal has a first value, a second period during which the driving signal has a second value that is different from the first value, and a third period during which the driving signal has a third value between the first value and the second values. In one embodiment, the second value is less than the first value responsive to the scan transistor SCT being a P type transistor. Conversely, the second value is greater than the first value responsive to the scan transistor being a N type transistor. The driving signal may maintain the first value in the first period for a first time period, maintain a second value in the second period for a second time period, and maintain a third value in the third period for a third time period. The third period is a transition period between the first period and the second period.

In an embodiment, the second value and the third value may be less than the first value, and the second value may be less than the third value. The order of the first period, the second period and the third period may be variously arranged. For example, the first period, the third period and the second period may be sequentially arranged. As another example, the second period, the third period and the first period may be sequentially arranged. As another example, the first period, the third period, the second period, the third period and the first period may be sequentially arranged.

For example, in a driving signal 311 output from the first drive circuit 310 as shown in FIG. 3, there may sequentially arranged, in a first portion 331 of the driving signal that includes a first period having the largest value (the first value) of the driving signal 311 in the first portion 331, the third period having the intermediate value (the third value) of the driving signal 311 in the first portion 331, and the second period having the smallest value (the second value) of the driving signal 311 in the first portion 331. In a second portion 332 of the driving signal, the driving signal 311 includes the second period having the smallest value (the second value) of the driving signal 311 in the second portion 332, the third period having the intermediate value (the third value) of the driving signal 311 in the second portion 332, and the first period having the largest value (the first value) of the driving signal 311 in the second portion 332 are sequentially arranged. For more specific examples related thereto, it will be further described with reference to FIGS. 4 to 9.

In an embodiment, the first value may correspond to a maximum voltage value applied to a gate driving circuit of the display panel, and the second value may correspond to a minimum voltage value applied to the gate driving circuit of the display panel. For example, the maximum voltage value may correspond to a gate high voltage VGH, and the minimum voltage value may correspond to a gate low voltage VGL. The third value is a predetermined value between the maximum voltage value and the minimum voltage value, and may correspond to, for example, 0, but is not limited thereto. The gate driving circuit may provide a scan signal (e.g., SCAN of FIG. 2) for driving the display panel to the display panel based on the application of the gate high voltage and the gate low voltage.

Meanwhile, length of the driving signal 311 output from the first drive circuit 310 may be increased while being transmitted to the second drive circuit 320. That is, similar to a driving signal (hereinafter, referred to an input driving signal 321) input to the second drive circuit 320 shown in FIG. 3, the length of the driving signal (hereinafter, referred to an output driving signal 311) output from the first drive circuit 310 may be increased. Specifically, a first portion 331 of the output driving signal 311 may be deformed like a first portion 341 of the input driving signal 321 by stretching while being transmitted to the second drive circuit 320. A second portion 332 of the output driving signal 311 may be deformed like a second portion 342 of the input driving signal 321 by stretching while being transmitted to the second drive circuit 320.

Such stretching or sagging of the signal may be caused by an increase in the temperature of the display device or various components included in the display device. In addition, in some cases, a length of a sampling time 350 may be changed due to the signal stretching, which may cause unexpected driving errors in the display device.

However, the display device according to an embodiment of the present disclosure may reduce the change in the length of the sampling time 350 by appropriately adjusting the signal according to the temperature, thereby reducing a driving abnormality of the display device. Accordingly, the display device may maintain display quality at a stable level despite temperature change.

In an embodiment, the first drive circuit 310 may acquire information about the temperature associated with the display device from another device or a temperature sensor included in the display device. The first drive circuit 310 may control (adjust or set) at least one of the duration of the second period and the duration of the third period based on the acquired temperature information.

Specifically, the first drive circuit 310 may set (e.g., adjust) the third period so that the third value is maintained for a first predetermined length (or time duration) according to the temperature, or may set (e.g., adjust) the second period so that the second value is maintained for a predetermined second length (e.g., time duration) according to the temperature. In this case, the time for which the third value is maintained may be different from the time for which the second value is maintained.

In an embodiment, the temperature associated with the display device may correspond to the temperature of at least a part of the first drive circuit 310, the second drive circuit 310, and the display panel (e.g., the display panel 105 of FIG. 1). For example, the temperature associated with the display device may include a temperature of an output terminal of the first drive circuit, a temperature of an input terminal of the second drive circuit, or a temperature of at least a portion of the light emitting device of the display panel. However, the present disclosure is not limited thereto, and the temperature associated with the display device may include a temperature of a predetermined portion in relation to the display device, such as the overall temperature of the display device, the temperature of a line disposed between the first drive circuit and the second drive circuit, etc. in addition, the temperature of this portion may be directly measured through a temperature sensor included in the first drive circuit, or temperature information may be received from another device (or other component).

In an embodiment, in the case that the temperature associated with the display device is included in a first temperature range, the first drive circuit 310 may control a length of the third period to correspond to a first length. If the temperature is included in a second temperature range, the display device may control a length of the third period to correspond to a second length.

In this case, the temperature value included in the first temperature range may be less than the temperature value included in the second temperature range. The first length may be greater than the second length. For example, the first temperature range may be included in less than 50° C., and the second temperature range may be included in 50° C. or more. More specifically, for example, the first temperature range may correspond to greater than 25° C. and less than 50° C., and the second temperature range may correspond to greater than 50° C. and less than 70° C. The first length may correspond to 0.3 μs (microsecond) and the second length may correspond to 0.05 μs for example Thus, the first length is longer than the second length.

In another embodiment, in the case that the temperature associated with the display device is included in the first temperature range, the first drive circuit 310 may control a length of the second period to correspond to a third length. If the temperature is included in the second temperature range, the display device may control the length of the second period to correspond to a fourth length. In this case, the temperature value included in the first temperature range may be less than the temperature value included in the second temperature range. For example, the first temperature range may include less than 50° C., and the second temperature range may include greater than 50° C. The third length may be less than the fourth length. The third length may correspond to 1.6 μs and the fourth length may correspond to 1.75 μs.

In an embodiment, the first drive circuit 310 may acquire information about the temperature associated with the display device from another device or a temperature sensor included in the display device. The first drive circuit 310 may set, based on the acquired information, the third period so that the third value is maintained for a predetermined time according to the temperature, and set the second period so that the second value is maintained for a predetermined time according to the temperature. In this case, the time for maintaining the third value may be different from the time for maintaining the second value.

In an embodiment, if the temperature associated with the display device is included in the first temperature range, the first drive circuit 310 may control the length of the third period to correspond to the first length, and control the length of the second period to correspond to the third length. If the temperature is included in the second temperature range, the display device may control the length of the third period to correspond to the second length and control the length of the second period to correspond to the fourth length.

In this case, the temperature value included in the first temperature range may be less than the temperature value included in the second temperature range. That is, the temperature value included in the first temperature range is a temperature that is less than the temperature value included in the second temperature range. For example, the first temperature range may be less than 50° C., and the second temperature range may be greater than or equal to 50° C. The first length may be greater than the second length, and the third length may be less than the fourth length. For example, the first length may correspond to 0.3 μs and the second length may correspond to 0.05 μs.

Examples expressed as numbers, such as the temperature range and the length of the period described throughout this specification, are merely examples for convenience of description, and the present embodiments are not limited thereto.

Although not shown in FIG. 3, the display device may further include a display panel. In this case, the gate signal generated by the second drive circuit 320 may be provided to the display panel. The display panel may emit light from the light emitting device based on the gate signal. Since the light emitting operation of the light emitting device using the gate signal may be implemented by various known techniques, a detailed description thereof will be omitted.

Figure 4:
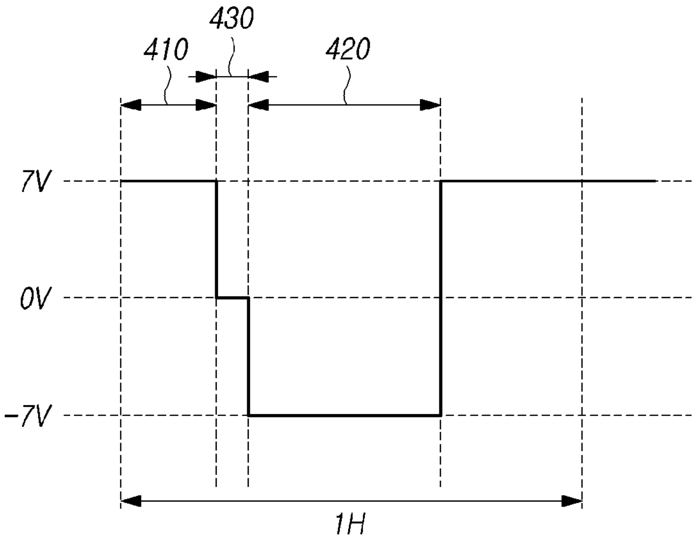
FIG. 4 is a diagram for explaining an example of a driving signal of a display device according to an embodiment of the present disclosure.

FIG. 4 is a diagram for explaining an example of a driving signal of a display device according to an embodiment of the present disclosure. FIG. 4 illustrates an example of a waveform of a driving signal provided from a first drive circuit 310 to a second drive circuit 320.

Referring to FIG. 4, the driving signal may include a plurality of period (e.g., a first period 410, a second period 420 and a third period 430). The first period 410 may have a first value, the second period 420 may have a second value, and the third period 430 may have a third value. In FIG. 4, the first value may be 7V, the second value may be −7V, and the third value may be 0V, but this is an example and is not limited thereto.

In an embodiment, the third period 430 is a duration of time between the first period 410 and the second period 420 during which the driving signal transitions from the first level (e.g., 7V) to the second level (e.g., −7V) by having a third level (e.g., 0V) during the third period 430. Thus, the third period 430 may be a period having a value between the values of the first period 410 and the second period 420, and may be a period for buffering a change in a value (or a voltage value). For example, the third period 430 may be a period for buffering a change in the voltage value by maintaining the voltage value at a value between the first value and the second value for a predetermined period, when the voltage value is rapidly changed from the first value to the second value. By using the third period 430, the display device may be driven more effectively by preventing wastage of power consumption due to a sudden change in voltage value.

Such a third period 430 may be included in a portion transitioning from the first period 410 to the second period 420 as shown.

In an embodiment, the first period 410 may have a first length of time, the second period 420 may have a second length of time, and the third period 430 may have a third length of time. The length of at least one of the first period 410, the second period 420 and the third period 430 may be predetermined according to a temperature associated with the display device.

In an embodiment, one period (1H) may be 3.04 μs. The length of the first period 410, the second period 420 and the third period 430 may be changed according to the temperature within one period. For example, if the temperature associated with the display device is included in the first temperature range, the second period 420 may be 1.6 μs and the third period 430 may be 0.3 μs. If the temperature associated with the display device is included in the second temperature range, the second period 420 may be 1.75 μs, and the third period 430 may be 0.05 μs. A more specific example related thereto may refer to FIG. 5.

Here, the temperature associated with the display device may include a temperature of at least a part of the display device. For example, the temperature associated with the display device may include a temperature of the entire display device, a temperature of the light emitting device disposed on the display panel, a temperature of the output terminal of the first drive circuit, or a temperature of the input terminal of the second drive circuit. The temperature associated with the display device may be identified based on information identified through a temperature sensor included in (or connected to) the display device.

Figure 5A:
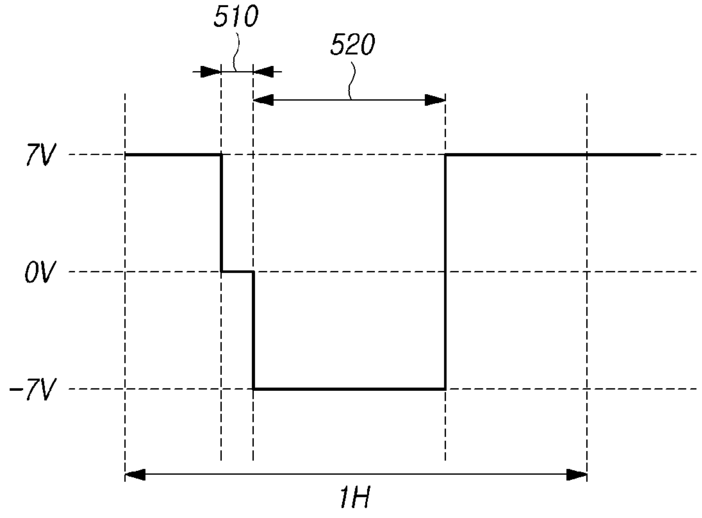
FIGS. 5A and 5B are diagrams for explaining an example of a driving signal provided based on a temperature in a display device according to an embodiment of the present disclosure.
Figure 5B:
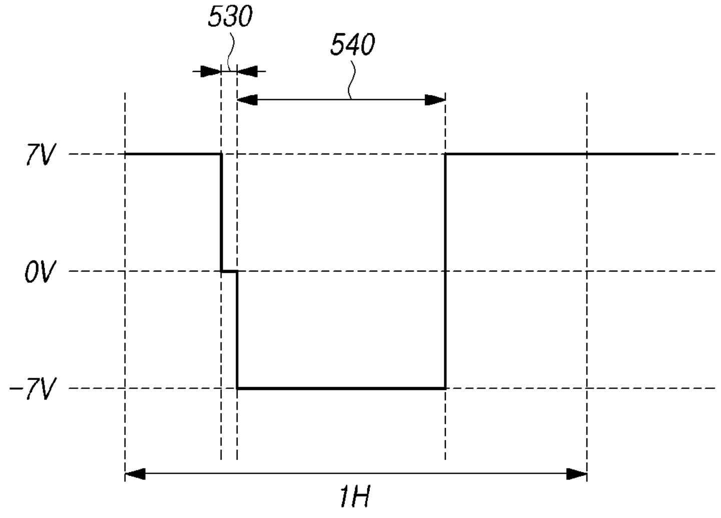

FIGS. 5A and 5B are diagrams for explaining an example of a driving signal provided based on a temperature in a display device according to an embodiment of the present disclosure.

FIG. 5A illustrates an example of a waveform of a driving signal in the case that the temperature associated with the display device is included in the first temperature range. Generally, the duration of time to transition from the first level of 7V to the second level of −7V (e.g., a fall time) is adjusted based on temperature by adjusting a duration of the second period 520 and a duration of the third period 510. The first temperature range is a temperature range corresponding to room temperature, and may include, for example, at least a portion of a temperature range of less than 50° C. Specifically, for example, the first temperature range may be 10° C. or more and less than 50° C. The first temperature range may be predetermined to correspond to room temperature, and is not limited to the above-described example.

In an embodiment, if the temperature associated with the display device is included in the first temperature range, at least one of the length (e.g., duration) of the third period 510 and the length (e.g., duration) of the second period 520 may be adjusted to a predetermined length corresponding to the first temperature range. For example, the length of the third period 510 may be 0.3 μs and the length of the second period 520 may be 1.6 μs.

FIG. 5B illustrates an example of a waveform of a driving signal in the case that the temperature associated with the display device is included in the second temperature range. The second temperature range is a temperature range corresponding to a high temperature in which the stretching of the signal waveform appears over a specific level, and may include, for example, at least a portion of a temperature range of 50° C. or higher. Specifically, for example, the second temperature range may be 50° C. or more and less than 70° C. The second temperature range may be preset to correspond to a high temperature and is not limited to the above-described example.

In an embodiment, if the temperature associated with the display device is included in the second temperature range, at least one of the length (e.g., duration) of the third period 530 and the length (e.g., duration) of the second period 540 may be adjusted to a predetermined length corresponding to the second temperature range. For example, the length of the third period 530 may be 0.05 μs. The length of the second period 540 may be 1.75 μs. Thus, if the temperature associated with the display device is in the second temperature range, the duration of time to transition from the first level to the second level (e.g., a fall time) is decreased relative to the duration of time to transition from the first level to the second level if the temperature associated with the display device is in the first temperature range.

Figure 6:
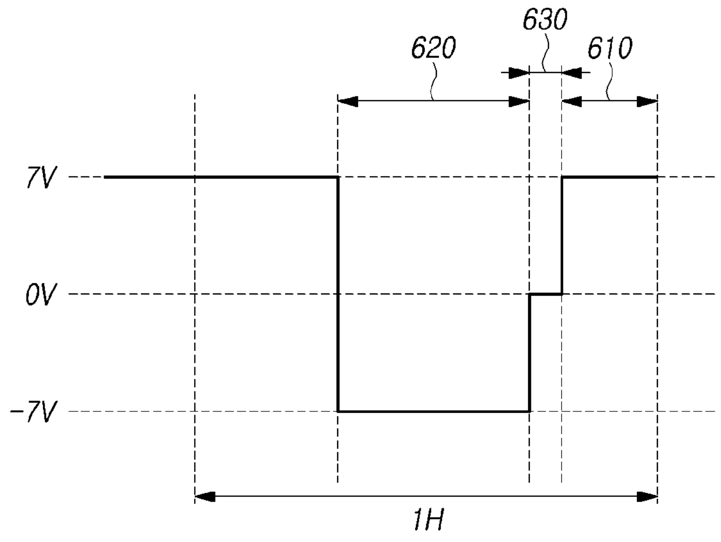
FIG. 6 is a diagram for explaining another example of a driving signal of a display device according to an embodiment of the present disclosure.

FIG. 6 is a diagram for explaining another example of a driving signal of a display device according to an embodiment of the present disclosure. FIG. 6 illustrates another example of a waveform of a driving signal provided from the first drive circuit to the second drive circuit. Generally, the duration of time to transition from the second level of −7V to the first level of 7V (e.g., a rise time) is adjusted based on temperature by adjusting a duration of the second period 620 and a duration of the third period 630. Hereinafter, in FIG. 6, there may be omitted the contents overlapping with those described with reference to FIGS. 4 and 5.

Referring to FIG. 6, the driving signal may include a plurality of periods (e.g., a first period 610, a second period 620, and a third period 630). During the first period 610 the driving signal has a first value, during the second period 620 the driving signal has a second value, and during the third period 630 the driving signal has a third value.

In an embodiment, the third period 630 may be disposed at a position in which the second period is changed to the first period 610. The third period 630 is a period having a value between the values of the first period 610 and the second period 620, and may be a period for buffering a change in a value (or a voltage value). This third period 630 may be included in a portion that transitions from the first period 610 to the second period 620 as shown.

In an embodiment, the first period 610 may have a first length, the second period 620 may have a second length, and the third period 630 may have a third length. The length of at least one of the first period 610, the second period 620 and the third period 630 may be predetermined according to a temperature associated with the display device.

In an embodiment, one period (1H) may be 3.04 μs. The length of the first period 610, the second period 620 and the third period 630 may be changed according to the temperature within one period. For example, in the case that the temperature associated with the display device is included in the first temperature range, the second period 620 may be 1.6

μs and the third period 630 may be 0.3 μs. If the temperature associated with the display device is included in the second temperature range, the second period 620 may be 1.75 μs, and the third period 630 may be 0.05 μs. A more specific example related thereto may refer to FIGS. 7A and 7B.

Figure 7A:
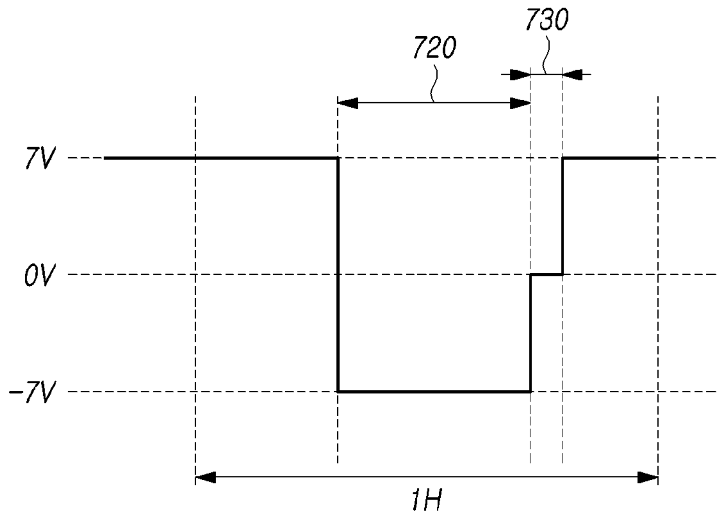
FIGS. 7A and 7B are diagrams for explaining another example of a driving signal provided based on a temperature in the display device according to an embodiment of the present disclosure.
Figure 7B:
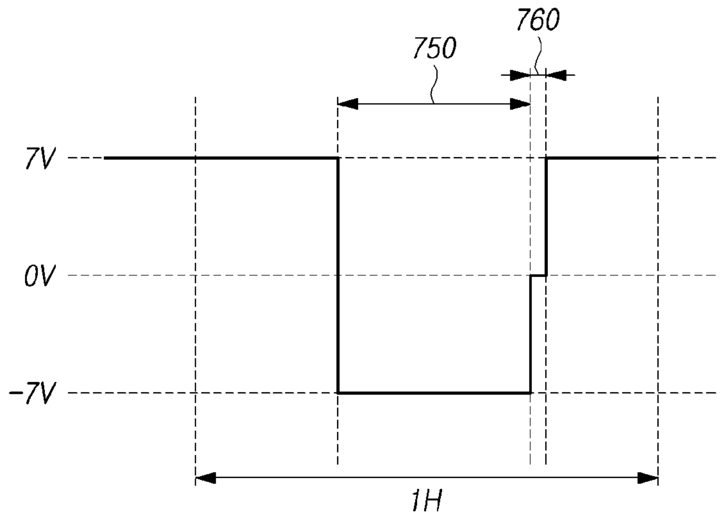

FIGS. 7A and 7B are diagrams for explaining another example of a driving signal provided based on a temperature in the display device according to an embodiment of the present disclosure.

FIG. 7A illustrates an example of a waveform of a driving signal in the case that the temperature associated with the display device is included in the first temperature range. The first temperature range is a temperature range corresponding to room temperature, and may include, for example, at least a portion of a temperature range of less than 50° C. Specifically, for example, the first temperature range may be 10° C. or more and less than 50° C. The first temperature range may be predetermined to correspond to room temperature, and is not limited to the above-described example.

In an embodiment, if the temperature associated with the display device is included in the first temperature range, at least one of the length of the third period 730 and the length of the second period 720 may correspond to a specified length predetermined corresponding to the first temperature range. For example, the length of the third period 730 may be 0.3 μs. The length of the second period 720 may be 1.6 μs.

FIG. 7B illustrates an example of a waveform of a driving signal in the case that the temperature associated with the display device is included in the second temperature range. The second temperature range is a temperature range corresponding to a high temperature in which the stretching of the signal waveform appears over a specific level, and may include, for example, at least a portion of a temperature range of 50° C. or higher. Specifically, for example, the second temperature range may be 50° C. or more and less than 70° C. The second temperature range may be preset to correspond to a high temperature and is not limited to the above-described example.

In an embodiment, if the temperature associated with the display device is included in the second temperature range, at least one of the length of the third period 760 and the length of the second period 750 may be adjusted to a predetermined length corresponding to the second temperature range. For example, the length of the third period 760 may be 0.05 μs. The length of the second period 750 may be 1.75 μs. Thus, if the temperature associated with the display device is in the second temperature range, the duration of time to transition from the second level to the first level (e.g., a rise time) is decreased relative to the duration of time to transition from the second level to the first level if the temperature associated with the display device is in the first temperature range.

In an embodiment, the starting point of the third periods 730 and 760 may be the same in the first temperature range and the second temperature range. Also, one period of the signal in the first temperature range and the second temperature range may be the same. For example, one period of the signal in the first temperature range and the second temperature range may be 3.04 μs.

Figure 8:
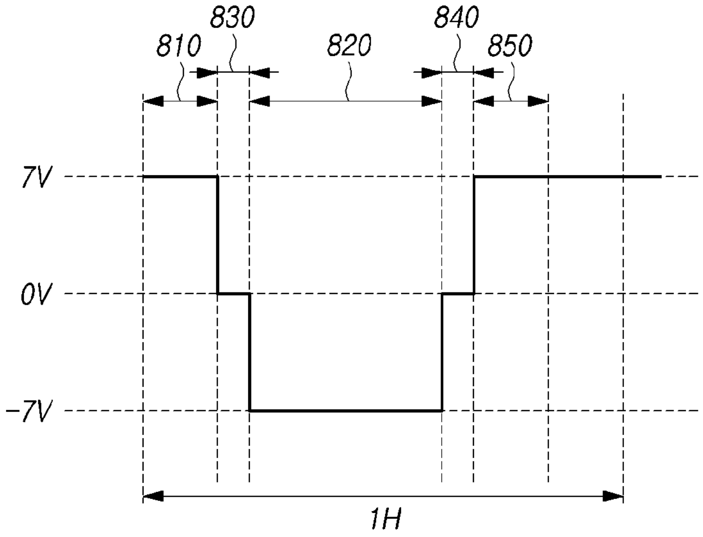
FIG. 8 is a diagram for explaining another example of a driving signal of a display device according to an embodiment of the present disclosure.

FIG. 8 is a diagram for explaining another example of a driving signal of a display device according to an embodiment of the present disclosure. FIG. 8 illustrates another example of a waveform of a driving signal provided from the first drive circuit 310 to the second drive circuit 320.

Referring to FIG. 8, the driving signal may include a plurality of periods (e.g., a first period 810, a second period 820, a third period 830, a fourth period 840 and a fifth period 850). During the first period 810 the driving signal maintains a first value, during the second period 820 the driving signal maintains a second value, and during the third period 830 the driving signal maintains a third value. During the fourth period 840 the driving signal maintains a fourth value, and during the fifth period 850 the driving signal maintains a fifth value.

In the embodiment, the third period 830 is disposed at a position of changing from the first period 810 to the second period 820, and the fourth period 840 may be disposed at a position of changing from the second period 820 to the fifth period 850. The third period 830 is a period having a value between the values of the first period 810 and the second period 820, and may be a period for buffering a change in a value (or a voltage value). The fourth period 840 is a period having a value between the values of the second period 820 and the fifth period 850, and may be a period for buffering a change in a value.

In an embodiment, the third value of the third period 830 and the fourth value of the fourth period 840 may correspond to each other. For example, the third value and the fourth value may be the same (e.g., match) or similar. However, the present disclosure is not limited thereto, and the value may be changed according to an embodiment.

In an embodiment, the lengths of the third period 830 and the fourth period 840 may correspond to each other. For example, the lengths of the third period 830 and the fourth period 840 may be the same or similar within a specific error range. However, the present disclosure is not limited thereto, and the length may be changed according to an embodiment.

In an embodiment, the first value of the first period 810 and the fifth value of the fifth period 850 may correspond to each other. For example, the first value and the fifth value may be the same or similar within a specific error range. However, the present disclosure is not limited thereto.

In an embodiment, the lengths of the first period 810 and the fifth period 850 may correspond to each other. For example, the lengths of the first period 810 and the fifth period 850 may be the same or similar within a specific error range. However, the present disclosure is not limited thereto, and the length may be changed according to an embodiment.

In an embodiment, in the case that the lengths and values of the third period 830 and the fourth period 840 are the same, each period may be referred to as the same term. For example, the fourth period 840 may be referred to as a third period. If the lengths and values of the first period 810 and the fifth period 850 are the same, each period may be referred to by the same term. For example, the fifth period 850 may be referred to as a first period.

According to an embodiment, the length of the fifth period 850 may be set to a longer length than shown in drawings. However, even in this case, the length may correspond to one period (1H).

In an embodiment, one period of the waveform of the driving signal of FIG. 8 may correspond to one period of the waveform described with reference to FIGS. 4 to 7. That is, one period of the waveform may be constantly maintained despite the order of periods included in the signal waveform being changed. For example, one period (1H) may be constantly maintained at 3.04 μs.

The length of at least a part of the periods (e.g., the first period 810 to the fifth period 850) included in the driving signal may be predetermined according to a temperature associated with the display device. For example, the length of at least a part of the periods included in the driving signal may be changed (e.g., adjusted) according to temperature within one period. For example, when the temperature associated with the display device is included in the first temperature range, the second period 820 may be 1.6 μs, and the third period 830 and the fourth period 840 may be 0.3 μs, respectively. If the temperature associated with the display device is included in the second temperature range, the second period 820 may be 1.75 μs, and the third period 830 and the fourth period 840 may be 0.05 μs, respectively. In this case, the first period 810 and the fifth period 850 may correspond to the remaining portion of one period. A more specific example related thereto may refer to FIG. 9.

Figure 9A:
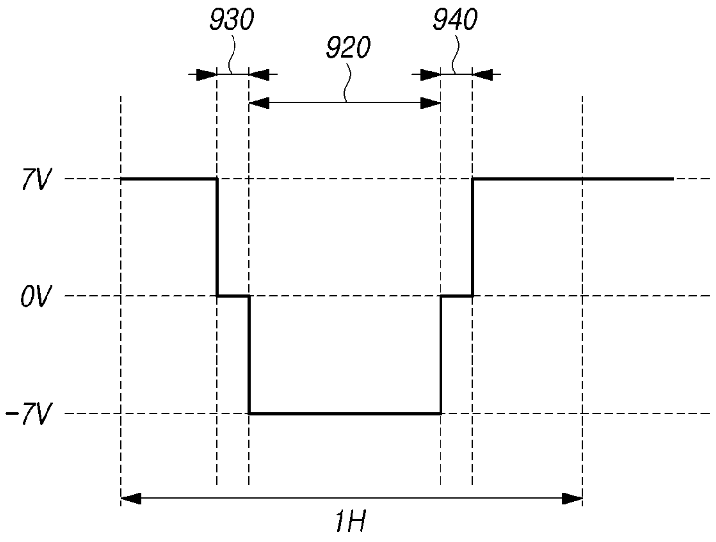
FIGS. 9A and 9B are diagrams for explaining another example of a driving signal provided based on a temperature in a display device according to an embodiment of the present disclosure.
Figure 9B:
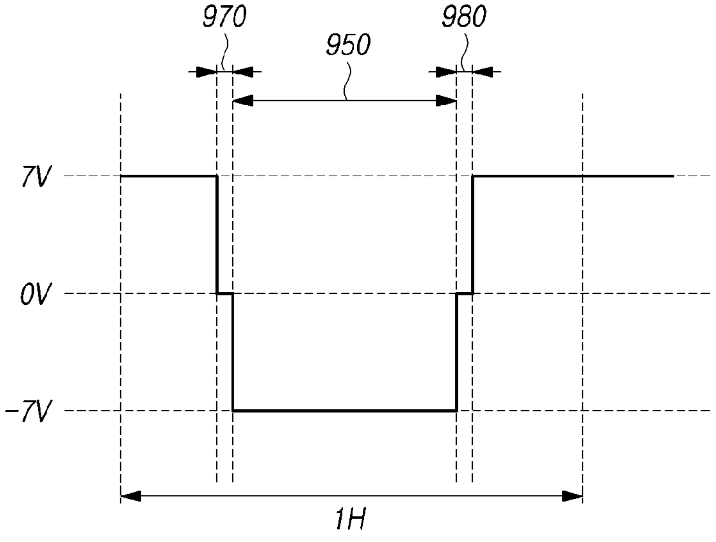

FIGS. 9A and 9B are diagrams for explaining another example of a driving signal provided based on a temperature in a display device according to an embodiment of the present disclosure.

FIG. 9A illustrates an example of a waveform of a driving signal in the case that the temperature associated with the display device is included in the first temperature range. The first temperature range is a temperature range corresponding to room temperature, and may include, for example, at least a portion of a temperature range of less than 50° C. Specifically, for example, the first temperature range may be 10° C. or more and less than 50° C. The first temperature range may be predetermined to correspond to room temperature, and is not limited to the above-described example.

In an embodiment, if the temperature associated with the display device is included in the first temperature range, at least one of the length of the third period 930, the length of the fourth period 940 and the length of the second period 920 may correspond to a specified length predetermined corresponding to the first temperature range. For example, the length of the third period 930 and the length of the fourth period 940 may be 0.3 μs, respectively. The length of the second period 920 may be 1.6 μs.

FIG. 9B illustrates an example of a waveform of a driving signal in the case that the temperature associated with the display device is included in the second temperature range. The second temperature range is a temperature range corresponding to a high temperature in which the stretching of the signal waveform appears over a specific level, and may include, for example, at least a portion of a temperature range of 50° C. or higher. Specifically, for example, the second temperature range may be 50° C. or more and less than 70° C. The second temperature range may be preset to correspond to a high temperature and is not limited to the above-described example.

In an embodiment, if the temperature associated with the display device is included in the second temperature range, at least one of the length of the third period 970 and the fourth period 980 and the length of the second period 950 may correspond to a specified length preset corresponding to the second temperature range. For example, the length of the third period 970 and the fourth period 980 may be 0.05 μs. The length of the second period 750 may be 1.75 μs.

In an embodiment, the starting point of the third periods 930 and 970 may be the same in the first temperature range and the second temperature range. Also, one period of the signal in the first temperature range and the second temperature range may be the same. For example, one period of the signal in the first temperature range and the second temperature range may be 3.04 μs.

In addition, in the embodiment, the third period and the fourth period for each temperature (e.g., the third period 930 and the fourth period 940 in the first temperature range, the third period 970 and the fourth period 980 in the second temperature range) may have the same condition. In this case, the two periods may be referred to by the same term, and the embodiment of the present disclosure is not limited to this example.

Figure 10A:
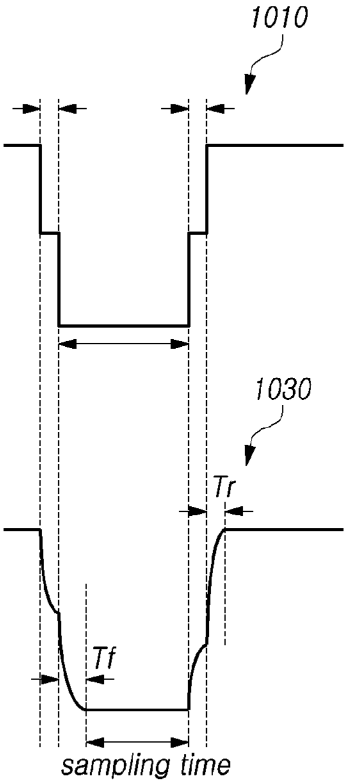
FIGS. 10A and 10B are diagrams for explaining a change according to a temperature of a signal used in a display device according to an embodiment of the present disclosure.
Figure 10B:
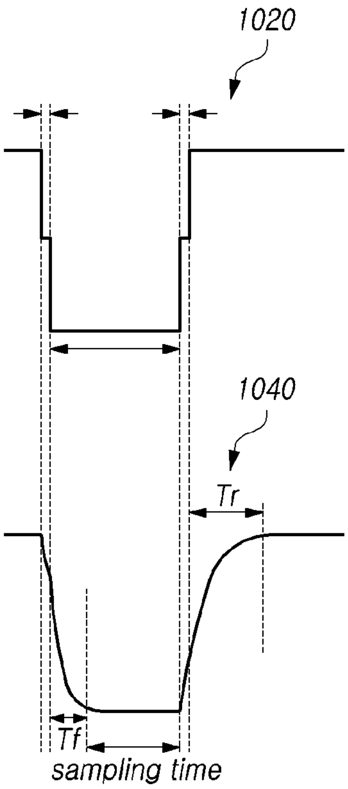

FIGS. 10A and 10B are diagrams for explaining a change according to a temperature of a signal used in a display device according to an embodiment of the present disclosure. Specifically, FIGS. 10A and 10B are diagrams for explaining by comparing output waveforms and input waveforms of signals in the first temperature range and the second temperature range.

FIG. 10A illustrates a waveform of the driving signal output from the first drive circuit in the first temperature range (e.g., room temperature) and a waveform before being input to the second drive circuit. FIG. 10B illustrates a waveform of the driving signal output from the first drive circuit in the second temperature range (e.g., high temperature higher than room temperature) and a waveform before being input to the second drive circuit.

More specifically, reference number 1010 of FIG. 10A denotes a waveform of a driving signal output from the first drive circuit in a first temperature range. Reference number 1020 of FIG. 10B denotes a waveform of a driving signal output from the first drive circuit in the second temperature range. The first temperature range may be a range for a lower temperature than the second temperature range.

Comparing reference number 1010 and reference number 1020, there can be identified that the length of the third period, which is a period in which the intermediate value is maintained in the second temperature range as a higher temperature range, become shorter. In addition, there can be seen that the length of the second period, which is a period in which a low value is maintained in the second temperature range, becomes longer.

Reference number 1030 of FIG. 10A denotes a waveform before the driving signal output from the first drive circuit is input to the second drive circuit in the first temperature range. That is, the waveform of the driving signal identified at the input terminal of the second drive circuit is illustrated. Reference number 1040 of FIG. 10B denotes a waveform before the driving signal output from the first drive circuit is input to the second drive circuit in the second temperature range.

The driving signal identified at the input terminal of the second drive circuit may be stretched by the temperature associated with the display device and appear in the shape of reference numbers 1030 and 1040. That is, the signal waveform as shown in reference number 1010 appears when the driving signal corresponding to reference number 1010 is output from the first drive circuit, but in the process of being transmitted to the second drive circuit, it is affected by the resistance and/or temperature of the lines, so that the stretching of a signal may occur as shown in reference number 1030. In addition, a signal waveform as shown in reference number 1020 appears when the driving signal corresponding to reference number 1020 is output from the first drive circuit, but in the process of being transmitted to the second drive circuit, it is affected by resistance and/or temperature of the lines, so that the stretching of the signal may occurs as shown in reference number 1040.

The stretching or sagging of the signal may be different depending on the temperature, and the display device according to the embodiment of the present disclosure may adjust the period of the signal according to the temperature so that the sampling time is properly maintained despite the stretching of the signal.

In this regard, comparing reference number 1030 and reference number 1040, there can be seen that the length of the sampling time is similar even though the waveforms output in each temperature range are different.

In reference number 1030 and reference number 1040, Tf is an abbreviation of 'falling time', which may mean the time required for voltage falling when a specific voltage falls. Tr is an abbreviation of 'rising time', and may mean the time required for voltage rise when a specific voltage rises. According to the embodiment of the present disclosure, it is possible to constantly secure a sampling time despite a change in Tf or Tr according to a change in temperature. In addition, the embodiment of the present disclosure can minimize the degree of increase in Tr according to the temperature rise to prevent or at least reduce signal delay.

Figure 11:
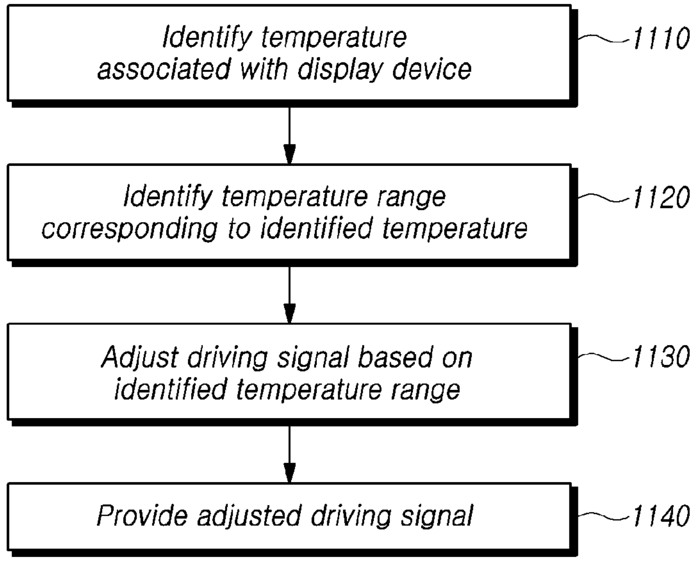
FIG. 11 illustrates each step of an operation of a display device according to an embodiment of the present disclosure.

FIG. 11 illustrates each step of an operation of a display device according to an embodiment of the present disclosure. Each step shown in FIG. 11 may be performed in a different order from that shown in the drawing, or an additional operation may be included between each step in some cases. Hereinafter, there may be omitted content overlapping with the above-described configuration.

In step 1110, the display device (or the first drive circuit) may check a temperature associated with the display device. For example, the display device may check the temperature associated with the display device from a temperature sensor included in the display device or a temperature sensor connected to the display device by wire or wirelessly.

The temperature associated with the display device is a predetermined target temperature, and may include, for example, a temperature of the light emitting device, a temperature of the first drive circuit, or a temperature of the surrounding environment.

In step 1120, the display device may identify a temperature range corresponding to the checked temperature. For example, in the case that the display device checks the temperature associated with the display device, the display device may identify which temperature range the checked temperature belongs to among the first temperature range and the second temperature range.

In step 1130, the display device may adjust the driving signal based on the identified temperature range. In an embodiment, if it is determined that the identified temperature corresponds to the first temperature range, the display device may adjust the length of at least one period of the driving signal to a predetermined length corresponding to the first temperature range. For example, the display device may adjust the length of a first period of the driving signal to a first length predetermined corresponding to the first temperature range, and adjust the length of the second period to a second length predetermined corresponding to the first temperature range. In this case, the length for each period may be different, but is not limited thereto.

In step 1140, the display device may provide an adjusted driving signal. The display device may control the adjusted driving signal to be output through the first drive circuit and input to the second drive circuit. The second drive circuit may generate a signal for light emission of the display device, for example, a gate signal, based on the input driving signal.

Figure 12:
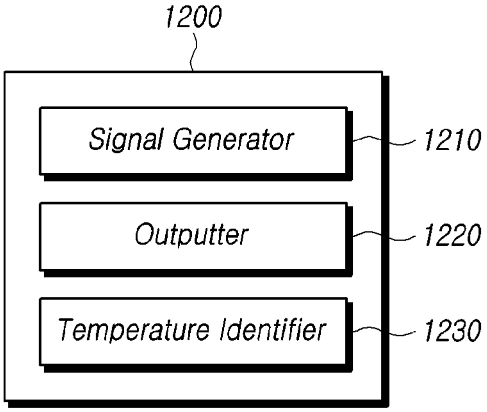
FIG. 12 is a functional block diagram of a first drive circuit included in a display device according to an embodiment of the present disclosure.

FIG. 12 is a functional block diagram of a first drive circuit included in a display device according to an embodiment of the present disclosure. Each element of the first drive circuit to be described later may be implemented as a combination of hardware and/or software. Hereinafter, there may be omitted the content overlapping with the content described above.

Referring to FIG. 12, the first drive circuit 1200 may include a signal generator 1210 (e.g., a circuit) and an outputter 1220 (e.g., a circuit). The first drive circuit 1200 may be implemented as at least one of a data driver, a timing controller, and a level shifter included in the display device, which may vary according to an implementation form of the display device.

The signal generator 1210 may generate a driving signal, which is a signal related to driving of the display device. The driving signal may include, for example, a clock signal, but is not limited thereto.

In an embodiment, the signal generator 1210 may generate a driving signal including a first period during which the driving signal maintains a first value, a second period during which the driving signal maintains a second value, and a third period during which the driving signal maintains a third value between the first value and the second value, based on the information on the temperature associated with the display device.

The temperature associated with the display device may be a temperature of all or a portion of at least one of various components included in the display device. For example, the temperature associated with the display device may include a temperature of at least a part of a data driver, a timing controller, a gate driver, and a display panel included in the display device. Here, the gate driver may be directly connected to the data driver and/or the timing controller, or may be indirectly connected to the data driver and/or the timing controller through another configuration (e.g., a memory, etc.). That the gate driver is directly or indirectly connected to the data driver and/or the timing controller may mean that the gate driver directly or indirectly transmits/receives driving-related signals or information with the data driver and/or the timing controller.

In an embodiment, the signal generator 1210 may set, in response to the identified temperature, the third period so that the third value is maintained for a predetermined time, or set the second period so that the second value is maintained for a predetermined time. In the case that the temperature is included in the first temperature range, the length of the third period may be set to correspond to a first length. If the temperature is included in the second temperature range, the length of the third period may be set to correspond to a second length. Here, the first temperature range may include a lower temperature range than the second temperature range, and the first length may be greater than the second length.

In addition, in the case that the temperature is included in the first temperature range, the length of the second period may correspond to a third length, and if the temperature is included in the second temperature range, the length of the second period may correspond to a fourth length. Here, the third length may be smaller than the fourth length.

In an embodiment, the outputter 1220 may output a driving signal. For example, the outputter 1220 may output a driving signal generated by the signal generator 1210. The driving signal output by the outputter 1220 may be provided to a specific configuration of the display device, for example, a gate driver.

According to an embodiment, the first drive circuit 1200 may further include a temperature identifier circuit 1230. The temperature identifier circuit 1230 may determine the temperature based on receiving information specifying the temperature from a temperature sensor included in the display device. The above-described operation of the signal generator 1210 may be performed based on the information on the temperature identified by the temperature identifier.

In one embodiment, a display apparatus comprising: a first drive circuit configured to output a driving signal, the driving signal including a first period during which the driving signal has a first value, a second period during which the driving signal has a second value different from the first value, and a third period during which the driving signal has a third value between the first value and the second value; a second drive circuit configured to receive the driving signal and generate a gate signal based on the driving signal; and a display panel including a light emitting device that is configured to emit light based on the gate signal, wherein a length of at least one of the first period, the second period, or the third period is adjustable based on a temperature associated with the display apparatus.

In one embodiment, the temperature associated with the display apparatus is a temperature of at least one of the first drive circuit, the second drive circuit, or the display panel.

In one embodiment, the first drive circuit is configured to set the third period having the third value for a predetermined time according to the temperature associated with the display apparatus.

In one embodiment, the first drive circuit is configured to set the second period having the second value for a predetermined time according to the temperature associated with the display apparatus.

In one embodiment, a length of the third period is a first length responsive to the temperature being within a first temperature range, and the length of the third period is a second length that is less than the first length responsive to the temperature being within a second temperature range that is greater than the first temperature range.

In one embodiment, the first temperature range is less than 50° C. and the second temperature range is greater than 50° C., and the first length is 0.3 μs and the second length is 0.05 μs.

In one embodiment, a length of the second period is a third length responsive to the temperature being within the first temperature range, and a length of the second period is a fourth length that is greater than the third length responsive to the temperature being within the second temperature range.

In one embodiment, the first temperature range is less 50° C. and the second temperature range is greater than 50° C., and the third length is 1.6 μs, and the fourth length is 1.75 μs.

In one embodiment, the gate signal comprises a scan signal configured to turn on a first transistor included in a subpixel of the display panel to activate the subpixel, and a light emission signal configured to turn on a second transistor included in subpixel to enable light emission of a light emitting element included in the subpixel.

In one embodiment, the first value is a maximum voltage value applied to the display panel, and the second value is a minimum voltage value applied to the display panel.

In one embodiment, during the third period the driving signal transitions from the first value to the second value through the third value, or during the third period the driving signal transitions from the second value to the first value through the third value.

In one embodiment, the third period is a transition period between the first period and the second period.

In one embodiment, the first drive circuit comprises at least one of a data driver, a timing controller, and a level shifter, and the second drive circuit comprises a gate driver.

In one embodiment, the driving signal is a clock signal.

In one embodiment, a circuit included in a display apparatus comprising: a signal generator circuit configured to generate, a driving signal based on a temperature associated with the display apparatus, the driving signal comprising a first period during which the driving signal has a first value, a second period during which the driving signal has a second value different from the first value, and a third period during which the driving signal has a third value between the first value and the second value; and an outputter circuit configured to output the generated driving signal, wherein a length of at least one of the first period, the second period, or the third period of the driving signal is adjustable based on the temperature associated with the display device.

In one embodiment, the temperature associated with the display device is a temperature of at least a part of the data driver, a gate driver connected to the data driver, or a display panel included in the display apparatus.

In one embodiment, the circuit comprises: a temperature identifier circuit configured to receive information specifying the temperature from a temperature sensor included in the display apparatus, wherein the signal generator circuit adjusts the third period to a predetermined length of time and adjusts the second period to a predetermined length of time based on the temperature.

In one embodiment, a length of the third period corresponds to a first length responsive to the temperature being within a first temperature range, and the length of the third period corresponds to a second length that is less than the first length responsive to the temperature being within a second temperature range that is greater than the first temperature range.

In one embodiment, a length of the second period corresponds to a third length responsive to the temperature being within in a first temperature range, and a length of the second period corresponds to a fourth length responsive to the temperature being within in a second temperature range, wherein the first temperature range includes a temperature range that is less than the second temperature range, and the third length is less than the fourth length.

In one embodiment, the first value is a maximum voltage value applied to a display panel included in the display apparatus, and the second value is a minimum voltage value applied to the display panel.

In one embodiment, during the third period the driving signal transitions from the first value to the second value, or during the third period the driving signal transitions from the second value to the first value.

In one embodiment, the circuit comprises at least one of a data driver, a timing controller, and a level shifter.

In one embodiment, a display apparatus comprises: a first drive circuit configured to generate a driving signal having a first period during which the driving signal has a first value and a second period during which the driving signal has a second value different from the first value, the first drive circuit adjusting a length of time to transition between the first value and the second value based on a temperature associated with the display apparatus; a second drive circuit configured to receive the driving signal and generate a gate signal based on the driving signal; and a display panel including a light emitting device that is configured to emit light based on the gate signal.

In one embodiment, the first drive circuit is configured to increase the length of time to transition between the first value and the second value responsive to the temperature being within a first temperature range, and the first driving circuit is configured to decrease the length of time to transition between the first value and the second value responsive to the temperature being within a second temperature range that is greater than the first temperature range.

In one embodiment, the driving signal has a third period of time between the first period of time and the second period of time, the driving signal having a third level that is less than the first level and greater than the second level during the third period of time, and the first drive circuit is configured to increase or decrease the length of time to transition between the first value and the second value by adjusting a length of the third period of time and the second period of time based on the temperature.

In one embodiment, wherein the length of the third period is adjusted to have a first length and the length of the second period is adjusted to have a second length responsive to the temperature being within a first temperature range, and the length of the third period is adjusted to a third length that is less than the first length and the length of the second period is adjusted to a fourth length that is greater than the second length responsive to the temperature being within a second temperature range that is greater than the first temperature range.

In one embodiment, the first temperature range is less than 50° C. and the second temperature range is greater than 50° C.

In one embodiment, the first length, the second length, the third length, and the fourth length are different predetermined durations of time.

In one embodiment, the transition is from the first value to the second value or from the second value to the first value.

In one embodiment, the temperature associated with the display apparatus is a temperature of at least one of the first drive circuit, the second drive circuit, or the display panel.

Although the embodiments of the present disclosure have been described in more detail with reference to the accompanying drawings, the present invention is not necessarily limited to these embodiments, and various modifications may be possible within the scope without departing from the technical spirit of the present invention. Accordingly, the embodiments disclosed in the present disclosure are not intended to limit the technical spirit of the present invention, but to exemplarily explain the present invention, and the scope of the technical spirit of the present invention is not limited by these embodiments. Therefore, there should be understood that the embodiments described above are illustrative in all respects and not restrictive. The protection scope of the present invention should be construed by the following claims, and all technical ideas within the scope equivalent thereto should be construed as being included in the scope of the present invention.

What is claimed is:

1. A display apparatus comprising:

a first drive circuit configured to output a driving signal, the driving signal including a first period during which the driving signal has a first value, a second period during which the driving signal has a second value different from the first value, and a third period during which the driving signal has a third value between the first value and the second value;

a second drive circuit configured to generate a gate signal based on the driving signal; and a display panel including a light emitting device that is configured to emit light based on the gate signal.

2. The display apparatus of claim 1, wherein a length of at least one of the first period, the second period, or the third period is adjustable based on a temperature associated with the display apparatus.

3. The display apparatus of claim 2, wherein the temperature associated with the display apparatus is a temperature of at least one of the first drive circuit, the second drive circuit, or the display panel.

4. The display apparatus of claim 2, wherein the first drive circuit is configured to set the third period having the third value for a predetermined time according to the temperature associated with the display apparatus.

5. The display apparatus of claim 2, wherein the first drive circuit is configured to set the second period having the second value for a predetermined time according to the temperature associated with the display apparatus.

6. The display apparatus of claim 2, wherein a length of the third period is a first length responsive to the temperature being within a first temperature range, and the length of the third period is a second length that is less than the first length responsive to the temperature being within a second temperature range that is greater than the first temperature range.

7. The display apparatus of claim 6, wherein a length of the second period is a third length responsive to the temperature being within the first temperature range, and a length of the second period is a fourth length that is greater than the third length responsive to the temperature being within the second temperature range.

8. The display apparatus of claim 1, wherein the gate signal comprises a scan signal configured to turn on a first transistor included in a subpixel of the display panel to activate the subpixel, and a light emission signal configured to turn on a second transistor included in the subpixel to enable light emission of a light emitting element included in the subpixel.

9. The display apparatus of claim 1, wherein the first value is a maximum voltage value applied to the display panel, and the second value is a minimum voltage value applied to the display panel.

10. The display apparatus of claim 1, wherein during the third period the driving signal transitions from the first value to the second value through the third value, or during the third period the driving signal transitions from the second value to the first value through the third value.

11. The display apparatus of claim 1, wherein the third period is a transition period between the first period and the second period.

12. The display apparatus of claim 1, wherein the first drive circuit comprises at least one of a data driver, a timing controller, and a level shifter, and the second drive circuit comprises a gate driver.

13. The display apparatus of claim 1, wherein the driving signal is a clock signal.

14. A display apparatus comprising:

a first drive circuit configured to generate a driving signal having a first period during which the driving signal has a first value and a second period during which the driving signal has a second value different from the first value, the first drive circuit adjusting a length of time to transition between the first value and the second value;

a second drive circuit configured to receive the driving signal and generate a gate signal based on the driving signal; and a display panel including a light emitting device that is configured to emit light based on the gate signal.

15. The display apparatus of claim 14, wherein the first drive circuit is configured to adjust the length of time to transition between the first value and the second value based on a temperature associated with the display apparatus.

16. The display apparatus of claim 15, wherein the first drive circuit is configured to increase the length of time to transition between the first value and the second value responsive to the temperature being within a first temperature range, and the first drive circuit is configured to decrease the length of time to transition between the first value and the second value responsive to the temperature being within a second temperature range that is greater than the first temperature range.

17. The display apparatus of claim 15, wherein the driving signal has a third period of time between the first period of time and the second period of time, the driving signal having a third level that is less than the first value and greater than the second value during the third period of time, and the first drive circuit is configured to increase or decrease the length of time to transition between the first value and the second value by adjusting a length of the third period of time and the second period of time based on the temperature.

18. The display apparatus of claim 17, wherein the length of the third period is adjusted to have a first length and the length of the second period is adjusted to have a second length responsive to the temperature being within a first temperature range, and the length of the third period is adjusted to a third length that is less than the first length and the length of the second period is adjusted to a fourth length that is greater than the second length responsive to the temperature being within a second temperature range that is greater than the first temperature range.

19. The display apparatus of claim 15, wherein the temperature associated with the display apparatus is a temperature of at least one of the first drive circuit, the second drive circuit, or the display panel.

20. The display apparatus of claim 14, wherein the transition is from the first value to the second value or from the second value to the first value.

* * * * *